(12) United States Patent
Shiraishi (10) Patent No.: US 9,952,528 B2
(45) Date of Patent: *Apr. 24, 2018

(54) LENS MIRROR ARRAY, OPTICAL UNIT AND IMAGE FORMING APPARATUS

(71) Applicant: TOSHIBA TEC KABUSHIKI KAISHA, Shinagawa-ku, Tokyo (JP)

(72) Inventor: Takashi Shiraishi, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,672

(22) Filed: Aug. 22, 2017

(65) Prior Publication Data

US 2017/0351194 A1 Dec. 7, 2017

Related U.S. Application Data

(63) Continuation of application No. 14/933,071, filed on Nov. 5, 2015, now Pat. No. 9,778,591.

(30) Foreign Application Priority Data

Jan. 27, 2015 (JP) ................................ 2015-012871

(51) Int. Cl.
    *G03G 15/04* (2006.01)
    *G02B 17/08* (2006.01)
    *G02B 17/00* (2006.01)

(52) U.S. Cl.
    CPC ....... *G03G 15/0409* (2013.01); *G02B 17/002* (2013.01); *G02B 17/086* (2013.01); *G03G 2215/0132* (2013.01)

(58) Field of Classification Search
    CPC . G03G 15/0409; G02B 17/002; G02B 17/086
    See application file for complete search history.

(56) References Cited

U.S. PATENT DOCUMENTS

| 6,177,667 B1 | 1/2001 | Fujita et al. |
|---|---|---|
| 2003/0007067 A1 | 1/2003 | Masuda et al. |
| 2005/0093963 A1 | 5/2005 | Masuda |
| 2013/0100514 A1 | 4/2013 | Shiraishi |
| 2013/0235451 A1 | 9/2013 | Kubota et al. |
| 2013/0314754 A1 | 11/2013 | Shiraishi |
| 2013/0314797 A1 | 11/2013 | Shiraishi |
| 2014/0204430 A1 | 7/2014 | Shiraishi |
| 2014/0204474 A1 | 7/2014 | Shiraishi |
| 2016/0216635 A1 | 7/2016 | Shiraishi |

OTHER PUBLICATIONS

Ex Parte Quayle Action for U.S. Appl. No. 14/933,071 dated Mar. 29, 2017.

*Primary Examiner* — Ryan Walsh
(74) *Attorney, Agent, or Firm* — Amin, Turocy & Watson LLP (57) ABSTRACT

An example is a lens mirror array in which a plurality of optical elements, which comprises a first lens surface formed at the top of convex portion protruding outwards for converging light, a protrusion which includes a first mirror surface that reflects the light emitted from the first lens surface at the top and a light-shielding surface that has side walls at two sides thereof with respect to a light advancing direction and prevents advance of the light through the side walls, a second mirror surface that reflects the light reflected by the first mirror surface of the protrusion and a second lens surface that images the light emitted from the second mirror surface on an image plane, is arranged in a horizontal scanning direction.

7 Claims, 11 Drawing Sheets

LENS MIRROR ARRAY, OPTICAL UNIT AND IMAGE FORMING APPARATUS

CROSS-REFERENCE TO RELATED APPLICATIONS

This application is a Continuation of Application Ser. No. 14/933,071 filed Nov. 5, 2015, the entire contents of which are incorporated herein by reference.

This application is based upon and claims the benefit of priority from Japanese Patent Application No. 2015-012871, filed Jan. 27, 2015, the entire contents of which are incorporated herein by reference.

FIELD

Embodiments described herein relate generally to a lens mirror array constituted by lenses and mirrors, an optical unit and an image forming apparatus.

BACKGROUND

Conventionally, an image forming apparatus (image reading apparatus) such as a scanner, a copier, an MFP (multi-function peripheral) and the like, uses a lighting device and a lens array in which a plurality of lenses is arranged to form an image of a document on an image sensor and read the document image. Further, in an image forming apparatus such as a printer, a copier, an MFP (multi-function printer) and the like, using a light-emitting element such as LED and the lens array, light ray from the LED is imaged on a photoconductive drum through the lens array to form (expose) an image on the photoconductive drum. The lens array is constituted by combining a plurality of lenses with apertures.

However, if an optical axis between lenses through which a light ray passes deviates, the light ray enters into a lens or mirror of next element to generate stray light, and thus imaging property and light intensity variation of the lens array are greatly deteriorated. When a plurality of lenses and apertures are combined together, property of the lens array is deteriorated due to deviation at the time of assembly.

In Japanese Unexamined Patent Application Publication No. 2014-142449, an optical device (imaging element array) is disclosed in which a lens and a mirror are integrally molded to make deviation of the optical axis between the lens and the mirror small and a groove depth L of mirror surface is larger than a mirror width WO to reduce the stray light. However, as the groove depth L of mirror surface is larger than the mirror width WO, the flow of resin during molding is worse and molding time becomes long. Alternatively, there is a problem that width of protrusion to pitch is narrow to reduce optical efficiency.

DETAILED DESCRIPTION

In accordance with an embodiment, a lens mirror array is provided in which a plurality of optical elements, each of which comprises a first lens surface configured to be formed at the top of convex portion protruding outwards and converge light, a protrusion which includes a first mirror surface configured to reflect the light emitted from the first lens surface at the top and a light-shielding surface configured to have side walls at two sides thereof with respect to a light advancing direction and prevent advance of the light through the side walls, a second mirror surface configured to reflect the light reflected by the first mirror surface of the protrusion and a second lens surface configured to image the light emitted from the second mirror surface on an image plane, is arranged in a horizontal scanning direction; and when viewing surface of first lens surface side between the sidewall surfaces of arranged adjacent optical elements in a horizontal scanning direction, the protrusion keeps a predetermined distance with the first lens surface nearby principal ray of the light emitted from the first lens surface and is formed into a shape protruding towards the first lens surface side.

Hereinafter, the embodiment is described with reference to the accompanying drawings. The same reference numerals are applied to the same components in each figure.

Figure 1:
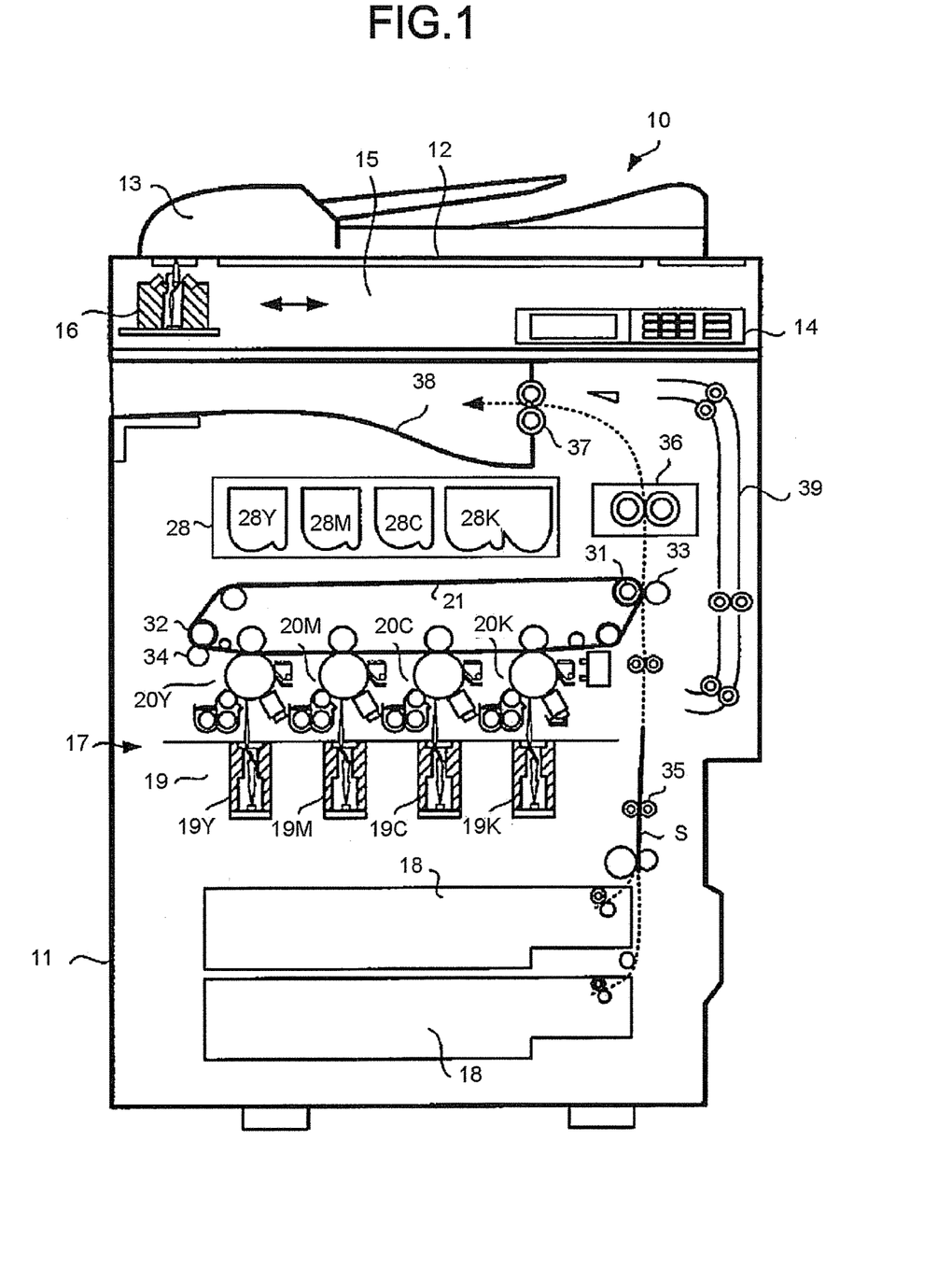
FIG. 1 is a diagram illustrating the structure of an image forming apparatus using an optical device according to an embodiment.

FIG. 1 is a diagram illustrating the structure of an image forming apparatus using an imaging element array (optical device) of integration of a lens and a mirror. In FIG. 1, an image forming apparatus 10 is, for example, an MFP (multi-function peripheral), a printer and a copier. In the following description, the MFP is exemplified.

A document table 12 of transparent glass is arranged at the upper portion of a main body 11 of an MFP 10, and an ADF (automatic document feeder) 13 is arranged on the document table 12 to be opened and closed. An operation panel 14 is arranged at the upper portion of the main body 11. The operation panel 14 includes various keys and a touch panel type display section.

A scanner section 15 serving as a reading device is arranged at the lower portion of the ADF 13 in the main body 11. The scanner section 15 reads a document sent from the ADF 13 or a document placed on the document table to generate image data and thus is provided with a contact-type image sensor 16 (hereinafter, simply referred to as "image sensor". The image sensor 16 is arranged in a horizontal scanning direction (depth direction in FIG. 1).

The image sensor 16, in a case of reading an image of the document placed on the document table 12, reads the document image line by line while moving along the document table 12. The image sensor 16 is executed throughout whole document size to read the document corresponding to one page. In a case of reading an image of the document sent from the ADF 13, the image sensor 16 is located at a fixed position (position shown in FIG. 1).

A printer section 17 is arranged at the center of the main body 11 and a plurality of cassettes 18 for housing papers of various sizes is arranged at the lower portion of the main body 11. The printer section 17 includes a photoconductive drum and an optical scanning device for exposing the photoconductive drum. The optical scanning device, which is provided with a scanning head 19 containing a LED serving as light-emitting element, exposes the photoconductive drum with the light ray from the scanning head 19 to generate an image.

The printer section 17 processes image data read by the scanner section 15 and image data created by a PC (personal computer) to form an image on a paper serving as an image receiving medium. The printer section 17, which is, for example, a color laser printer in a tandem system, contains image forming sections 20Y, 20M, 20C and 20K of each color of yellow (Y), magenta (M), cyan (C) and black (K).

The image forming sections 20Y, 20M, 20C and 20K are parallelly arranged at the lower side of an intermediate transfer belt 21 along downstream side thereof from upstream side thereof. The scanning head 19 also includes a plurality of scanning heads 19Y, 19M, 19C and 19K in response to the image forming sections 20Y, 20M, 20C and 20K.

Figure 2:
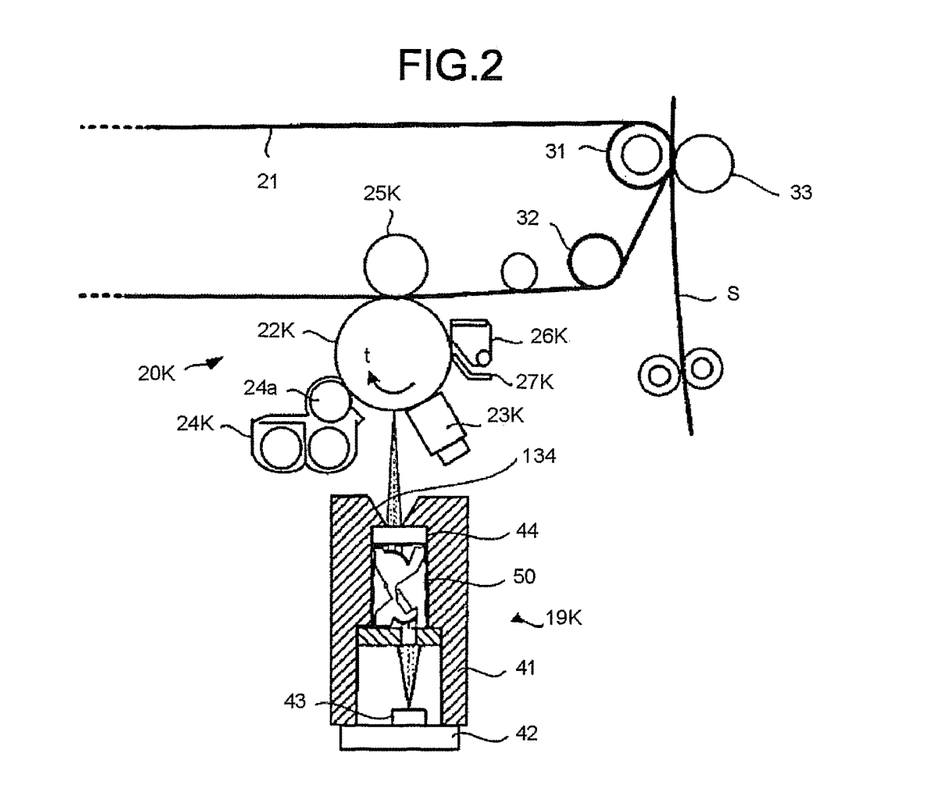
FIG. 2 is a diagram illustrating an enlarged image forming section according to the embodiment.

FIG. 2 is a diagram illustrating an enlarged image forming section 20K within the image forming sections 20Y, 20M, 20C and 20K. In the following description, as each of image forming sections 20Y, 20M, 20C and 20K has the same structure, the image forming section 20K is described as a representation.

As shown in FIG. 2, the image forming section 20K includes a photoconductive drum 22K serving as an image carrier. A charging charger 23K, a developing device 24K, a primary transfer roller 25K, a cleaner 26K and a blade 27K are arranged around the photoconductive drum 22K along a rotation direction t. An exposure position of the photoconductive drum 22K is irradiated with light from the scanning head 19K to carry an electrostatic latent image thereon.

The charging charger 23K of the image forming section 20K uniformly charges the whole surface of the photoconductive drum 22K. The developing device 24K supplies two-component developing agent consisting of black toner and carrier to the photoconductive drum 22K through a developing roller 24a to which developing bias is applied to form a toner image on the photoconductive drum 22K. The cleaner 26K, using the blade 27K, removes the toner left on the surface of the photoconductive drum 22K.

As shown in FIG. 1, a toner cartridge 28 for supplying the toner to the developing devices 24Y-24K is arranged at the upper portion of the image forming sections 20Y-20K. The toner cartridge 28 contains toner cartridges (28Y-28K) of each color of yellow (Y), magenta (M), cyan (C) and black (K).

The intermediate transfer belt 21 is stretched by a driving roller 31 and a driven roller 32 and moves cyclically. The intermediate transfer belt 21 is opposite to the photoconductive drums 22Y-22K in contact with each other. As shown in FIG. 2, a primary transfer voltage is applied to a position where the intermediate transfer belt 21 faces the photoconductive drum 22K through a primary transfer roller 25K and the toner image on the photoconductive drum 22K is primarily transferred onto the intermediate transfer belt 21.

A secondary transfer roller 33 is arranged to face the driving roller 31 which stretches the intermediate transfer belt 21. At the time a paper S passes through a position between the driving roller 31 and the secondary transfer roller 33, a secondary transfer voltage is applied to the paper S through the secondary transfer roller 33. Then the toner image on the intermediate transfer belt 21 is secondarily transferred onto the paper S. A belt cleaner 34 is arranged nearby the driven roller 32 of the intermediate transfer belt 21.

As shown in FIG. 1, a conveyance roller 35 for conveying the paper S taken out from a paper feed cassette 18 is arranged between the paper feed cassette 18 and the secondary transfer roller 33. Further, a fixing device 36 is arranged at the downstream side of the secondary transfer roller 33.

A conveyance roller 37 is arranged at the downstream side of the fixing device 36. The conveyance roller 37 discharges the paper S to a paper discharge section 38. A reverse conveyance path 39 is arranged at the downstream side of the fixing device 36. The reverse conveyance path 39 reverses the paper S and guides the reversed paper S in a direction of the secondary transfer roller 33, and thus the reverse conveyance path 39 is used at the time of a duplex printing.

Next, the structure of the scanning head 19K of the optical scanning device is described with reference to FIG. 2. The scanning head 19K is opposite to the photoconductive drum 22K to expose the photoconductive drum 22K. The photoconductive drum 22K can rotate at a preset rotation speed to store charge on the surface thereof and the photoconductive drum 22K is irradiated with the light from the scanning head 19K and exposed to form the electrostatic latent image on the surface thereof.

The scanning head 19K includes an optical device 50 which is abutted against a dustproof cover glass 44 and supported by a holder 41. At the bottom of the holder 41, a support 42 is arranged on which LED element 43 serving as light-emitting element is arranged. The LED elements 43 are arranged linearly at equal intervals in a horizontal scanning direction. A substrate (not shown) containing a driver IC for controlling the light emitting of the LED element 43 is arranged in the support 42. The detailed structure of the optical device 50 is described later.

The driver IC, which constitutes a control section, generates a control signal of the scanning head 19K based on the image data read by the scanner section 15 and the image data created by the PC to enable the LED element to emit light with a predetermined amount of light under the control of the control signal. Light ray emitted from the LED element 43 enters into the optical device 50 and is imaged on the photoconductive drum 22k through the optical device 50 to form the image on the photoconductive drum 22k. The cover glass 44 is installed at the upper portion (emission side) of the scanning head 19K.

Figure 3:
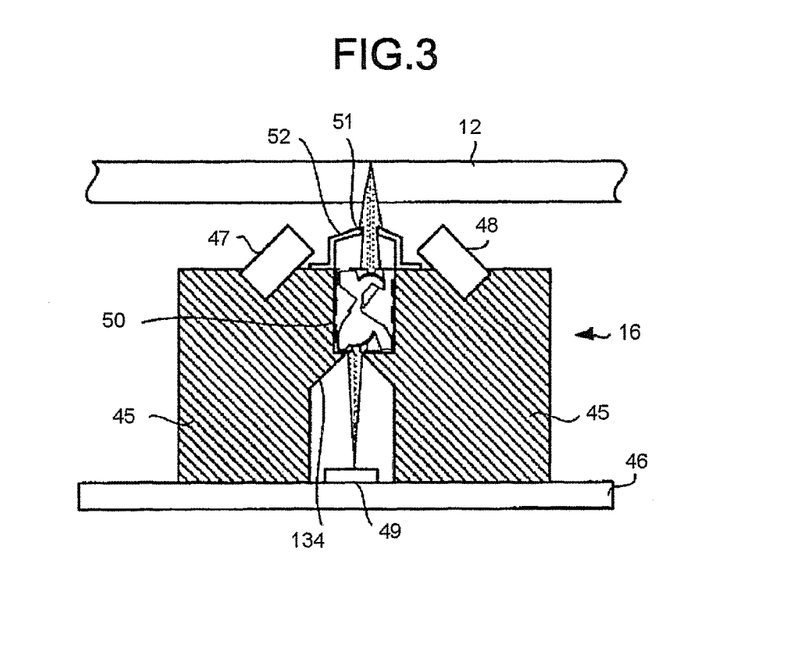
FIG. 3 is a diagram illustrating an enlarged image reading device according to the embodiment.

FIG. 3 is an illustration diagram illustrating the structure of the image sensor 16 of the scanner section 15 (reading device). The image sensor 16 reads an image of a document placed on the document table 12 or an image of a document fed by the ADF 13 according to the operation of the operation panel 14. The image sensor 16 is a one-dimensional sensor arranged in a horizontal scanning direction and contains a housing 45.

The housing 45 is arranged on a substrate 46. Two LED line lighting devices 47 and 48 for emitting the light in a direction of the document are arranged on the surface of the housing 45 at the document table 12 side in a manner of extending in a horizontal scanning direction (depth direction of FIG. 3). The LED line lighting devices 47 and 48 are equipped with LED and a light guide body. Light source is not limited to the LED and may be a fluorescent tube, a xenon tube, a cold cathode tube or an organic EL.

The optical device 50 described later is supported between the LED line lighting devices 47 and 48 at the upper portion of the housing 45 and a sensor 49 constituted by CCD, CMOS and the like is mounted on the substrate 46 in the bottom of the housing 45. A light shield 52 having a slit 51 is installed at the upper portion of the housing 45.

The LED line lighting devices 47 and 48 irradiate an image reading position of the document placed on the document table 12 and the light reflected by the image reading position enters into the optical device 50 via the slit 51. The optical device 50 functions as an erecting equal-magnification lens. The light entering into the optical device 50 is emitted from an emission surface of the optical device 50 and imaged on the sensor 49. That is, the reflection light reflected by the document within light emitted from the lighting devices 47 and 48 passes through the optical device 50. The imaged light, through the sensor 49, is converted into an electrical signal which is transferred to a memory section (not shown) of the substrate 46.

Figure 4:
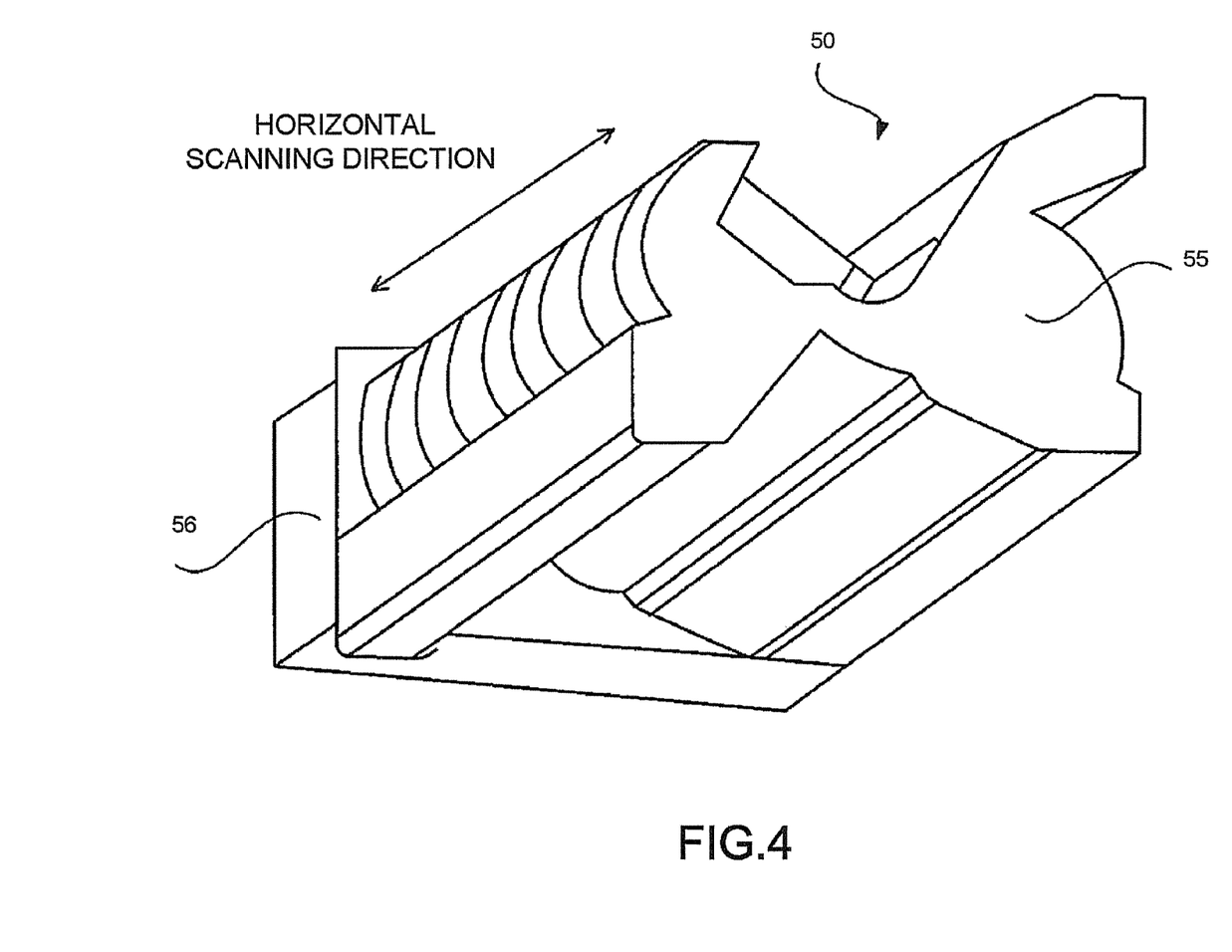
FIG. 4 is a perspective view of the optical device according to the embodiment.

Hereinafter, the structure of the optical device 50 is described in detail. The optical device 50 composes of optical elements which have the same structure subjected to integral molding. FIG. 4 is a perspective view illustrating the optical device 50 according to the embodiment. The optical device 50 is manufactured by integrating a plurality of optical elements 55 arranged parallelly in a horizontal scanning direction and a flange section 56 arranged for handling easy be touched by a hand at the time of handling. Herein, the optical elements arranged in a horizontal scanning direction as a whole are referred to as an optical element array body or a lens mirror array.

Figure 5:
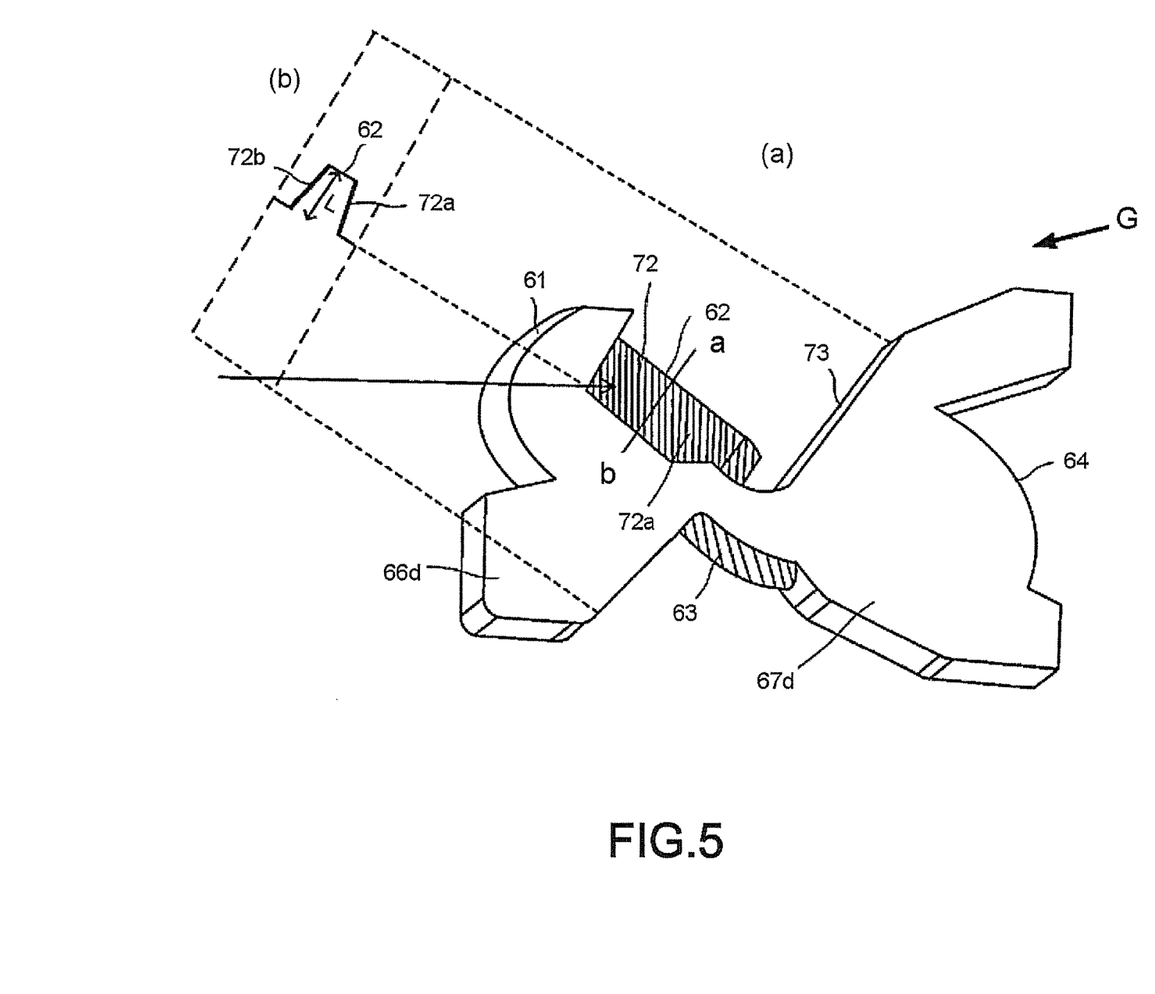
FIG. 5 is a perspective view of an optical element according to the embodiment.
Figure 6:
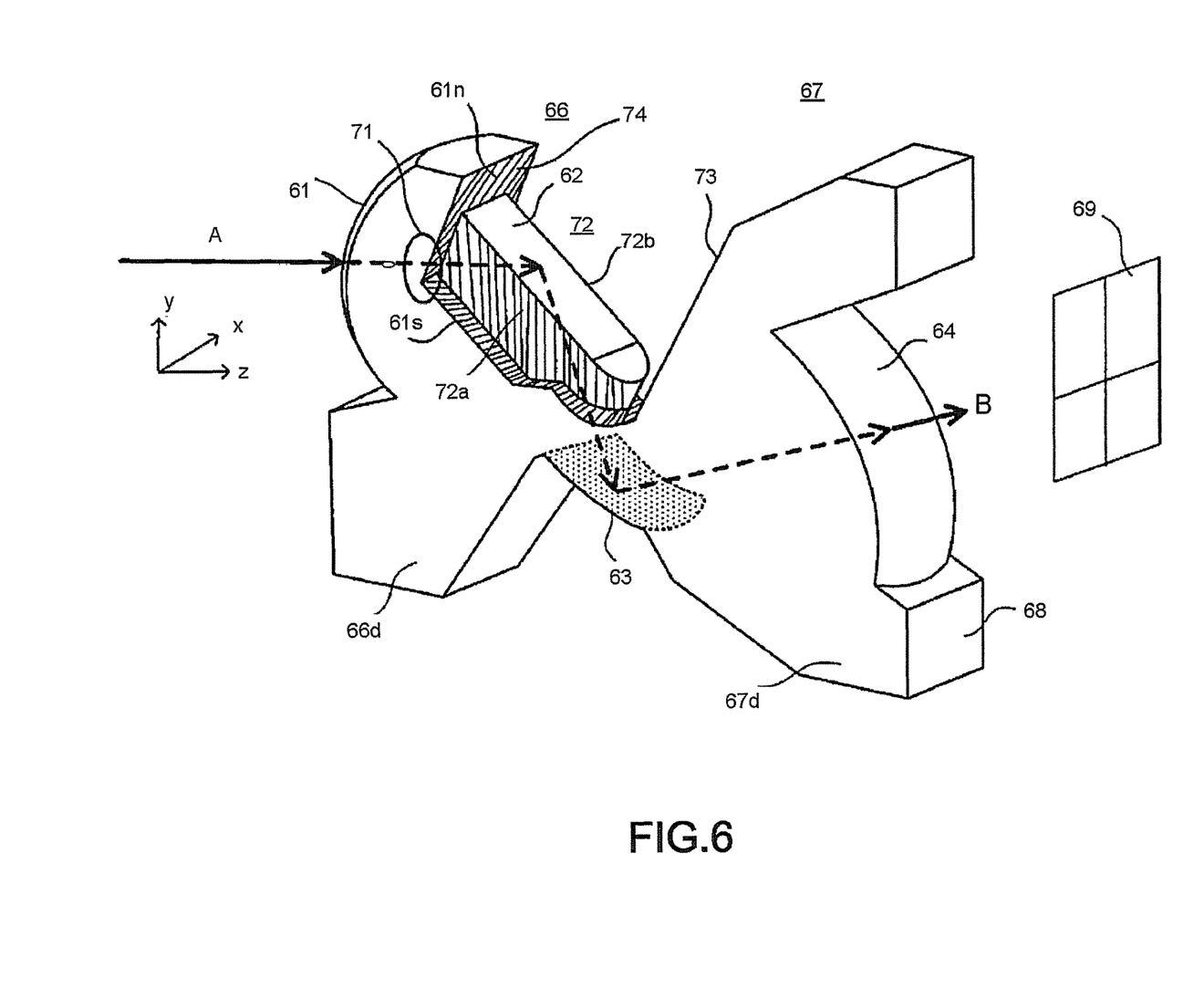
FIG. 6 is a perspective view of the optical element viewed from other direction according to the embodiment.

FIG. 5(*a*) is a perspective view of one optical element 55. FIG. 5(*b*) is a diagram illustrating the structure of a protrusion when the optical element 55 is cut off along line a-b shown in FIG. 5(*a*). FIG. 6 is a perspective view of the optical element 55 shown in FIG. 5(*a*) viewed from a direction indicated by an arrow G. The optical element 55, which is formed integrally with light transmissive material (glass or resin), reflects the incident light through a mirror surface using total internal reflection or Fresnel reflection to reflect the light to guide it in a predetermined direction. In FIG. 6, incident direction of the light is indicated by an arrow A and emission direction of the light is indicated by an arrow B. A surface for reflecting the light is referred to as a mirror surface.

The optical element 55, into which the light enters, is provided with a first convex lens surface 61 of which the surface protrudes outwards, a first mirror surface 62 for reflecting the incident light from the first lens surface 61, a second mirror surface 63 for reflecting the light reflected by the first mirror surface 62 once again and a second convex lens surface 64 protruding outwards for emitting the light reflected by the second mirror surface 63. The first mirror surface 62 is a plane, and the first lens surface 61 and the second lens surface 64 are curved not only in one direction but also in a direction orthogonal to the axis. For example, if it is assumed that a light incident direction of the first lens surface 61 of FIG. 6 is z axis, a horizontal direction vertical to the z axis is x axis and a direction vertical to the z axis and the x axis is y axis, the first lens surface 61 is curved not only in y axis direction, but also in x axis direction. The second lens surface also has the same kind of shape with the first lens surface.

Such a first lens surface 61 having a convex lens function is used to collect the incident light as much as possible and to form an intermediate reverse image. Further the second lens surface 64 having a convex lens function is used to form a reverse image of the intermediate reverse image formed by the first lens surface 61 to form an erect image.

It is regarded that the optical element 55, which largely consists of a first block 66 including the first lens surface 61, the first mirror surface 62 and a base 66*d* and a second block 67 including the second mirror surface 63, the second lens surface 64 and a base 67*d*, can be formed by integrating these two blocks.

As the light ray input to the first lens surface 61 of the optical element 55 enters into a different optical element and reaches an image plane to make imaging property deteriorated, it is called as stray light. The material of the optical element 55 is resin or glass with which the optical element 55 is formed.

In the first block 66, the first lens surface 61 thereof serving as light incident surface is in front, and a surface 74 (light-shielding surfaces 72*a* and 72*b* described later are not contained) which corresponds to an aperture surface and the emission surface of the first lens surface, and which is constituted by a plurality of surfaces indicated by a hatching of slashes in a direction of the upper right in FIG. 6, is formed into a shape in such a manner that the closer it is to a principal ray, the closer it becomes to the first lens surface side, and protrudes to be closest to the first lens surface side nearby the principal ray emitted from the first lens surface 61. Thus, the surface 74 includes a cutout portion 71 of obtuse angle approximate to right angle nearby the principal ray emitted from the first lens surface 61 and a protrusion 72 with a height L (recorded in FIG. 5(*b*)) in the light incident direction at the center of bottom of the cutout portion 71. As shown in FIG. 5(*b*), two surfaces of the protrusion 72 are light-shielding surfaces 72*a* and 72*b* and the top of the protrusion 72 is the first mirror surface 62.

The light-shielding surfaces 72*a* and 72*b* are arranged to prevent as much as possible that the light entering into the first lens surface 61 enters into an adjacent optical element as stray light and include downward slopes (taper) as shown in FIG. 5(*b*) to improve a release property during molding.

For example, a light absorbing surface 73 is formed on the slope plane of the second block in a light advancing direction to the first mirror surface 62 of the first block. The light absorbing surface 73 is arranged to prevent as much as possible that the light transmitting the first mirror surface 62 is collided and dispersed in the second block to become stray light, the light reflected by the second lens surface 64 is reflected inside the lens array to become the stray light and they reach the image plane.

The second block 67 includes the second mirror surface 63, the second lens surface 64, a flange section 68 of the second lens surface 64 and the base 67*d*. The reflection surface of the second mirror surface 63 is formed into a rectangle curved inwardly, and into a shape curved inside not only in a length direction but also in the vertical direction. The reflection surface with such a shape is used to prevent as much as possible that light reflected by the first mirror surface enters into the second mirror surface of an adjacent optical element through heightening the reflection surface peripheral, and to make emission angle after reflection of light serving as stray light reflected by the second mirror surface of the adjacent optical element different from that after reflection of light serving as regular light reflected by the second mirror surface of the optical element similar to that having the first mirror surface to create an area where the stray light and the regular light are separated spatially at the downstream side of the second mirror surface in the light path and in which a light-shielding section for shielding only the stray light and the light to be the stray light is set to shield only the stray light and the light to be the stray light without decreasing efficiency. The light converged by the second lens surface is converged in an image plane 69.

The light entering into the optical element 55 enters into the first lens surface asymmetric in vertical scanning direction (y axis direction), becomes light converged in both directions of horizontal scanning direction and vertical scanning direction and then enters into the first mirror surface 62 at the top of the protrusion 72. As shown in FIG. 5(a), the light-shielding surfaces 72a and 72b are formed on the side walls of two sides of the protrusion 72 and the light colliding with the light-shielding surfaces 72a and 72b is prevented from advancing.

The light of which advance is not prevented by the light-shielding surfaces 72a and 72b enters into the second mirror surface 63 asymmetric in a direction vertical to the horizontal scanning direction. The light ray between the first mirror surface 62 and the second mirror surface 63 forms a reverse image. The light ray is reflected by the second mirror surface 63 and then guided to the second lens surface 64 asymmetric in a direction vertical to the horizontal scanning direction. The light ray is imaged again by the second lens surface 64 to form an erecting equal-magnification image on the image plane 69.

Light-shielding films 61n and 61s are also arranged on the surface 74 where the protrusion 72 is contacted with a part where the first lens surface is arranged. The light-shielding films 61n and 61s are formed by, for example, UV ink.

Figure 7:
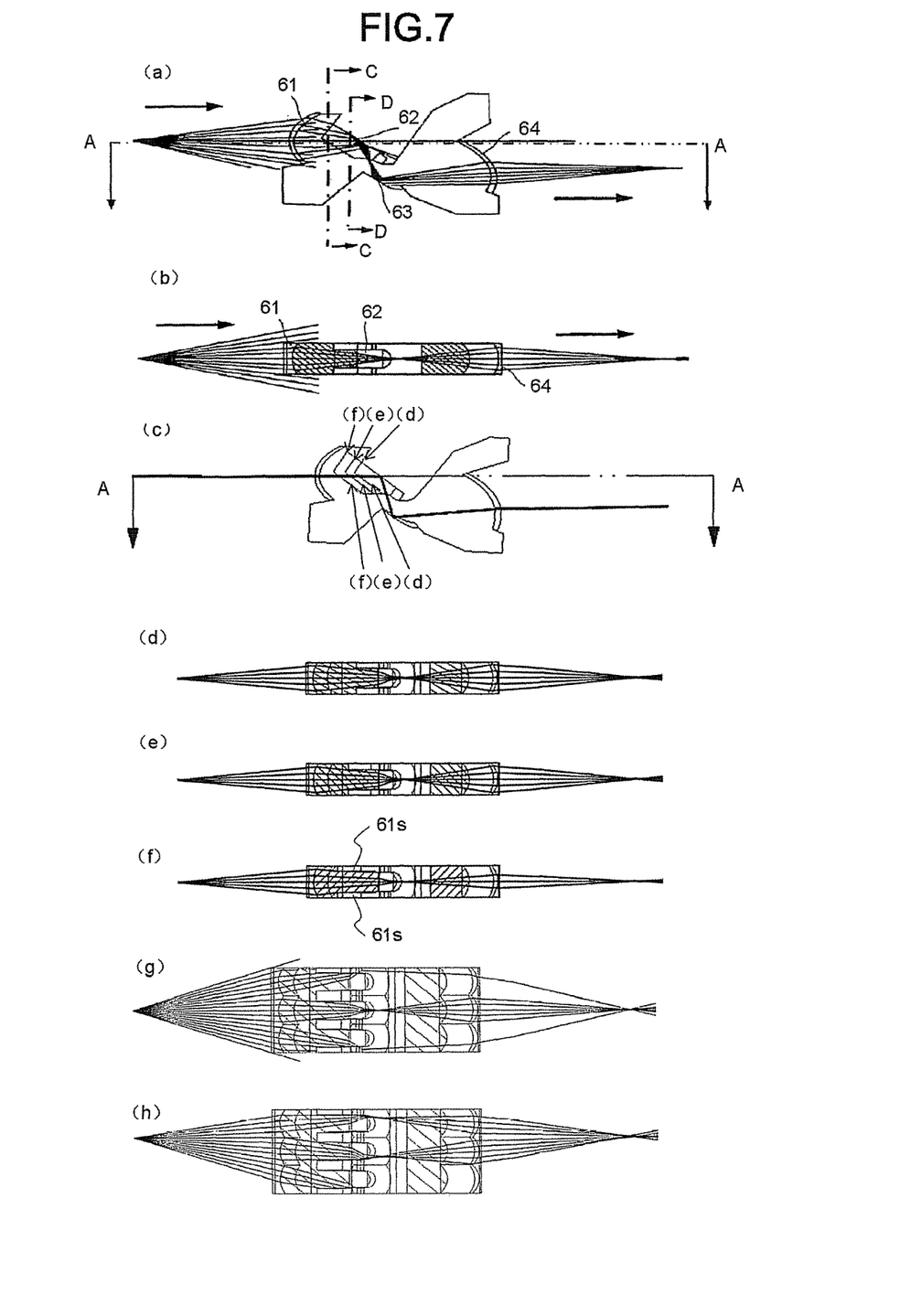
FIG. 7 is a diagram illustrating a state of input light and emission light of light ray corresponding to the optical element according to the embodiment.

The surface 74 keeps a predetermined distance with the first lens surface 61 nearby the principal ray when seen from the horizontal scanning direction and protrudes towards the first lens surface 61 side. As shown in FIG. 7(b), the predetermined distance is a distance from a part where the surface 74 protrudes towards the first lens surface 61 side of the side walls to a position where the light ray in a case in which an object point position in a horizontal scanning direction is on a surface containing the optical axis of the first lens surface is hardly shielded by the light-shielding surfaces 72a and 72b in the same optical element 55 of the first lens surface 61.

In a case of the present embodiment, and when the object point is in the plane including the optical axis of the first lens surface in a horizontal scanning direction, the principal ray appearing from the first lens surface 61 is almost coincident with the optical axis of the first lens surface 61.

FIG. 7(a) is a diagram illustrating transmission of the incident light, in the case in which an object point position in a horizontal scanning direction is on a surface containing the optical axis of the first lens surface, reflection and the path of the emission light viewing from the side surface of the optical element 55. FIG. 7(b) is a diagram illustrating transmission of the incident light, reflection and the path of the emission light viewing from a cross-section of straight line A-A shown in FIG. 7(a) of the optical element 55. The part protruding towards the first lens surface 61 side of the light-shielding surfaces 61n, 61s, 72a and 72b hardly reduce the amount of light of the regular light at this optical element in such a manner that the light ray in a case in which the object point position in a horizontal scanning direction is on a surface containing the optical axis of the first lens surface is hardly shielded by the light-shielding surfaces 61n, 61s, 72a and 72b in the same optical element 55 of the first lens surface 61. The light ray is converged in the first lens surface, and thus the further the light ray goes away from the first lens surface, the smaller width in the horizontal scanning direction of the beam of light is. Therefore, a range of position in the light advancing direction of the part protruding towards the first lens surface 61 side of the side walls is determined in response to the width of the light-shielding protrusion 72.

FIGS. 7(c), 7(d), 7(e), 7(f) are diagrams illustrating transmission of the incident fan rays including principal ray and extending in the horizontal scanning direction, when the distance from a part where the surface 74 protrudes towards the first lens surface 61 is changed. Label (d), (e), (f) shows each position of surface 74, and the label of the figure illustrating transmission of the incident light, reflection and the path of the emission light viewing from a cross-section of straight line A-A shown in FIG. 7(c) of the optical element 55.

The position according to the present embodiment, it is possible to avoid the decrease of the distance between the light-shielding surface 74 and the first lens surface, is shown in FIG. 7(e). This is the same condition as FIG. 7(b)

In case illustrated in FIG. 7(f), the distance from a part where the surface 74 protrudes towards the first lens surface 61 is small. The outermost rays, which reaches imaging plane in FIG. 7(d), and FIG. 7(e), are shielded by the light-shielding films 61s. In this case, the efficiency is smaller than case shown in FIG. 7(d) and FIG. 7(e).

In case illustrated in FIG. 7(d), the distance from a part where the surface 74 protrudes towards the first lens surface 61 is larger than in case of FIG. 7(e). In this case, the efficiency is almost same as shown in FIG. 7(e). But the power of the stray light increases.

Through FIG. 7(a) and FIG. 7(f), it is understood that the incident light from the first lens surface 61 is reflected by the first mirror surface 62 at the top of the protrusion 72 and then condensed by the second lens surface 64 after reflected by the second mirror surface 63. However, the actual lens mirror array generates not only necessary regular light but also unnecessary stray light.

In FIG. 7(g) and FIG. 7(h), the adjacent optical elements are also shown. FIG. 7(g) shows the case that the object point position in a horizontal scanning direction is on a surface containing the principal ray passing through optical axis of the first lens surface. FIG. 7(h) shows the case that the object point position in a horizontal scanning direction is on a boundary surface of an element next to each other.

With the lens and mirror array of this constitution, the case that there is at the position that an object point is shown in FIG. 7(g) tends to come to have a smallest light quantity.

In this embodiment in FIG. 7(g), the center optical element, which is same as shown in FIGS. 7(b) and (e), focuses about 65% of all light ray power. Therefor increasing the power of center optical element described before contributes increasing the all light beam power.

Figure 8:
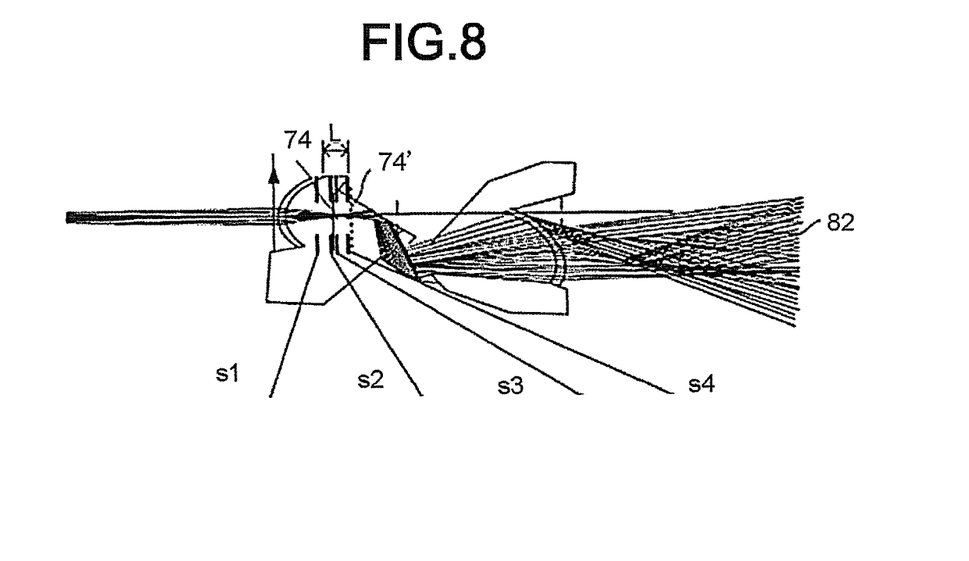
FIG. 8 is a diagram illustrating each position of the optical element according to the embodiment.
Figure 9:
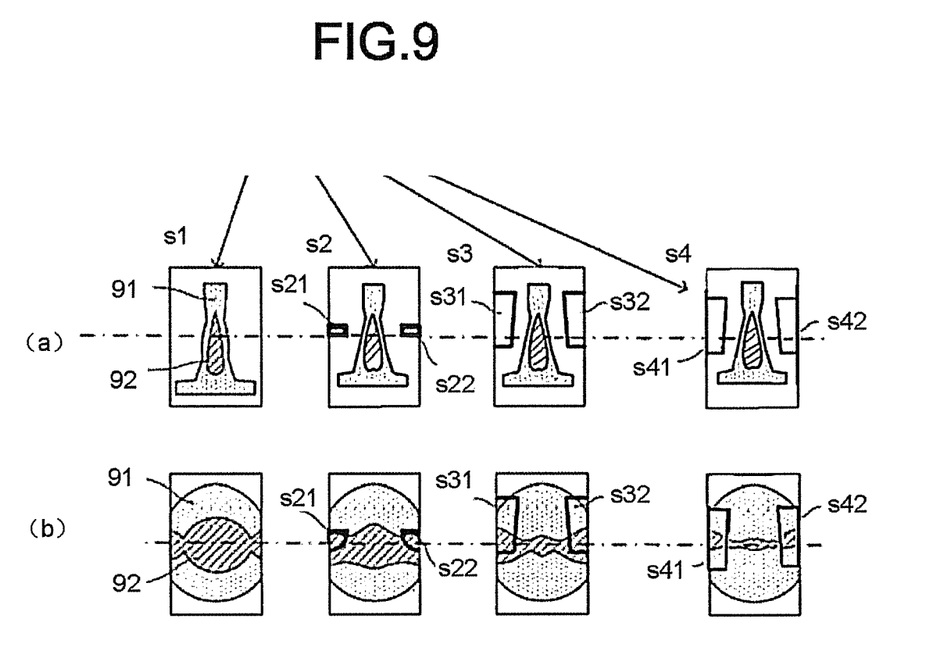
FIG. 9 is a diagram illustrating a cross-sectional distribution of regular light and stray light and light to be stray light of each position shown in FIG. 8 of the optical element and position of shielding film according to the embodiment.

Next, FIG. 8 and FIG. 9 illustrate states of the above-mentioned regular light and the stray light and the light to be the stray light and that obtained light serving as regular light is not shielded as much as possible to shield only the stray light and the light to be the stray light.

In FIG. 8 and FIG. 9, a light-shielding surface 74' shows a status of a placement method of the conventional light-shielding section which is placed in a plane vertical to the optical axis, which is different from a case in which the light-shielding surface 74 is formed into a shape in such a manner that the closer the light-shielding surface 74 of the present embodiment is to the principal ray, the closer it is to the first lens surface side. In FIG. 8, the light-shielding surface 74' indicated by a thick dotted line is a surface vertical to the optical axis of the first lens surface, wherein distance between edge of the first lens surface 61 and edge of the light-shielding surface 74', that is, thickness of the edge (edge thickness) is similar to thickness of edge in the case of the light-shielding surface 74 of the present embodiment indicated by thick solid line. In this case, within the light entering into the optical element 55, the closer the light-shielding surface 74 of the present embodiment is to the principal ray, the more the light-shielding surface 74 protrudes towards the first lens surface side so that the shielded light by the light-shielding surface 74 is not shielded by the light-shielding surface 74' and reflected by the first mirror surface 62 and a second mirror surface 63 of the adjacent optical element and emitted from the second lens surface of the other optical element as the stray light.

Intensity distribution of the regular light at each position in a case of the light-shielding surface 74 and in a case of the light-shielding surface 74' is identical, which is shown in FIG. 7(a).

FIG. 9 shows the intensity distributions of the regular light and the stray light and the light to be the stray light at each cross-section when the light-shielding surface 74' with a placement method of light-shielding section of conventional method is applied instead of the light-shielding surface 74 and an area where the light is shielded by the light-shielding surface 74 of the present embodiment at each cross-section. The form of the light-shielding section in the example shows that the regular light when the light-shielding surface 74' is applied is not shield and only the stray light and the light to be the stray light generated at the time the light-shielding surface 74' is applied can be shielded.

FIG. 9(a) illustrates the intensity distributions of the regular light of the cross-section at each of positions s1, s2, s3 and s4 of the incident light from the first lens surface 61 of the first block 66 when the light-shielding surface 74' shown with the thick dotted line is assumed to be a surface vertical from the edge at the time the light-shielding surface 74 is placed and the light shielding is started. FIG. 9(b) illustrates the intensity distributions of the stray light and the light to be the stray light of the cross-section at each position. These intensity distributions are simulation results.

The position s1 shows a position on the light path where the light shielding is not carried out yet at the first lens surface 61 side between side-wall surfaces for light-shielding, and the position s2 shows a position on the light path where the light shielding begins to be carried out through the light-shielding surface 74 with the structure of the embodiment at the first lens surface 61 side between side-wall surfaces for light-shielding in the embodiment. Further, the position s3 shows a surface which is vertical to the principal ray and contains straight lines where the plane of the first mirror surface 62 intersects the light-shielding surface 74. The position s4 shows a position slightly located at the upstream side of the light path of the light-shielding surface 74'.

In FIG. 9(a) and FIG. 9(b), abscissa indicated by dashed line is the position of the principal ray. Point area 91 is an area for indicating the existence of illumination by light which reaches to an image plane 69, and slash area 92 therein indicates an area where illumination is more than half of peak illumination of the point area 91.

In FIG. 9(a) and FIG. 9(b), thick frames s21, s22, s31, s32, s41 and s42 drawn at two sides of each cross-sectional view in FIG. 9(a) and FIG. 9(b) are cross-sections of the light-shielding surfaces 61n, 61s, 72a and 72b at the time of constitution of the embodiment, and the area between the line and vertical line indicating a boundary of the adjacent optical element shows a block area of light at the time of constitution of the embodiment. The block area changes at positions s2, s3 and s4, which is because the protrusion 72 is arranged obliquely with respect to the principal ray and the light-shielding surface 74 is inclined from the surface vertical to the principal ray.

The regular light shown in FIG. 9(a) is vertically long at any of positions s1, s2, s3 and s4 if viewed from the cross-section, and the light-shielding surfaces 61n, 61s, 72a and 72b are arranged to make the regular light almost pass through at all the positions s1, s2, s3 and s4.

On the other hand, the stray light and the light to be the stray light shown in FIG. 9(b) is an oblong if viewed from the cross-section, and is blocked at the side surface of the protrusion and the surface 74 by the blocks s21, s22, s31, s32, s41 and s42 caused by the light-shielding film.

The block areas s41 and s42 shows that the amount of light of the regular light does not be reduced and only the stray light and the light to be the stray light is shielded. Moreover, the light shielded by the block areas s21 and s22 is light advancing towards the center of the position s4 in the horizontal scanning direction in FIG. 9(b). Thus, the light obtained as stray light and light to be stray light can be almost shielded by the light shielding of the block areas s21, s22, s31, s32, s41 and s42 and the downstream side thereof. On the other hand, at the position s2, even if the side walls wholly shield light corresponding to part above the block areas s21 and s22, it is understood that the regular light is not almost shielded.

However, with such a structure, three risks are easy to occur, including: collapse of the shape of the first lens surface 61 due to very short distance L between upper side of the first lens surface 61 and upper side of the light-shielding surface 74 to cause insufficiency of mechanical strength of the upper side of the first lens surface 61, prolongation of molding time due to deterioration of the flow of the resin during molding and occurrence of strain due to large difference of thicknesses of the center and peripheral part of the lens to cause difference of heat shrinkage rate. Thus, it is desirable that the thickness from the first lens surface 61 to the surface 74 is identical to that from the center of the first lens surface 61 in a y direction to the lens edge as much as possible.

Further, it is desirable that the distance L at a position where the distance between the first lens surface 61 and the light-shielding surface 74 is shortest is guaranteed to be such a degree that problems such as intensity and flow of the resin do not occur. On the basis of it, in order to not only make the distance equal to distance to lens center but also suppress efficiently the occurrence of the stray light, it is desirable that the shape of the light-shielding surface 74 is a shape in which the first lens surface 61 moves parallelly in an optical axis direction.

Figure 10:
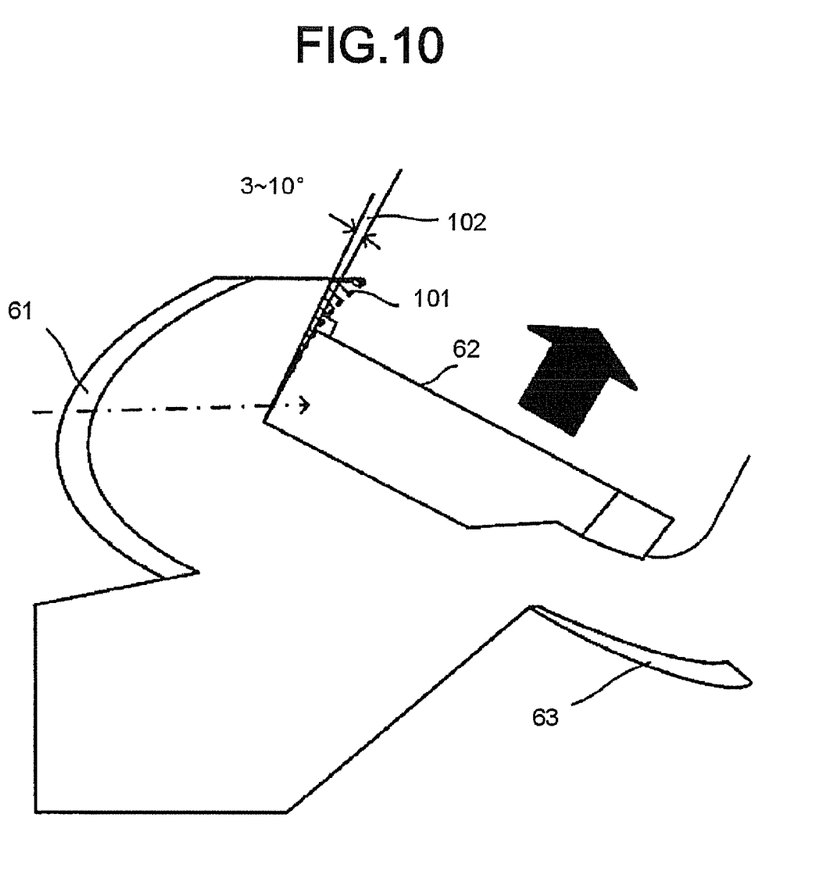
FIG. 10 is a diagram illustrating a state when the optical element is manufactured with an integral molding manner according to the embodiment.

A case in which the optical element 55 is integrally molded with the material such as resin is described with reference to FIG. 10. It is desirable that excessive force is not applied to the first mirror surface and peripheral part thereof at the time cavity or core insert is pulled out during a process in which the first mirror surface is manufactured more accurately through the integral molding. If the cavity or core insert is separated from the lens mirror array in a direction vertical to the first mirror surface, at a range close to the first mirror surface, an under cut is generated in a part 101 indicated by slashes of FIG. 10 in order not to apply a shearing force to the first mirror surface. Therefore, with further going towards the figure from the surface vertical to the first mirror surface 62, in a direction approaching the first mirror surface, if there is a surface on which a draft taper 102 of 3~10 degrees is fixed, the undercut does not occur, and as the draft taper exists and large force is not applied to the surface 74 at the time of opening mold, shape accuracy during molding can be improved easily.

A surface (surface formed by the light-shielding surface 61s) opposite to the first mirror surface between side-wall surfaces for light shielding has a slope almost parallel to the first mirror surface at the first lens surface 61 side.

From the above, it is desirable that the shape of the boundary surface of the first lens surface 61 of the side walls is a protruded shape in such a way as to have an angle about 3~10 degrees of 90 degrees positive draft nearby the principal ray when viewed from the horizontal scanning direction.

Herein, the protruded part is intersected with planes and is formed into a smooth curved surface and a free-form surface to further suppress the amount of stray light.

Figure 11:
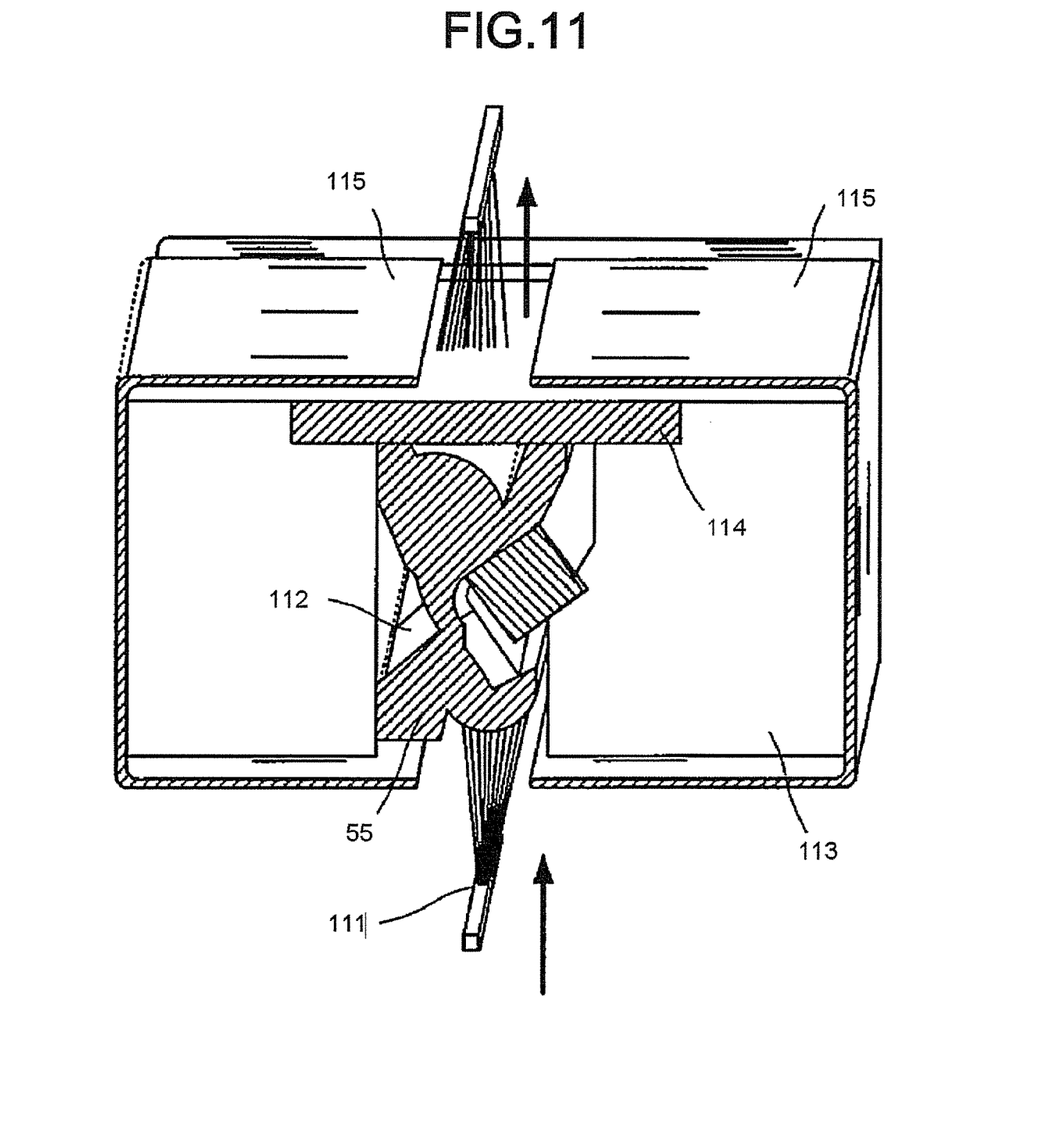
FIG. 11 is a diagram illustrating the structure when an array body is mounted as a unit according to the embodiment.

FIG. 11 is a perspective view illustrating an example of the unit structure at the time the optical device (lens mirror array) in which the abovementioned optical elements 55 are arranged in parallel is used as the scanning head 19. A LED line array 111 in which LEDs are arranged parallelly in a row is provided with LED light-emitting elements in a horizontal scanning direction and irradiates light from lower part in figure.

A lens mirror array 112 in which the optical elements 55 are arranged is fixed and built in a housing 113. A hole is opened at the lower part in figure of the housing 113 and the light from the LED line array enters into each of the optical elements 55.

A dustproof glass 114 is arranged on the housing 113. The dustproof glass 114 is pressed against the housing 113 through a plate spring 115. The plate spring 115 functions as a light-shielding member.

Figure 12:
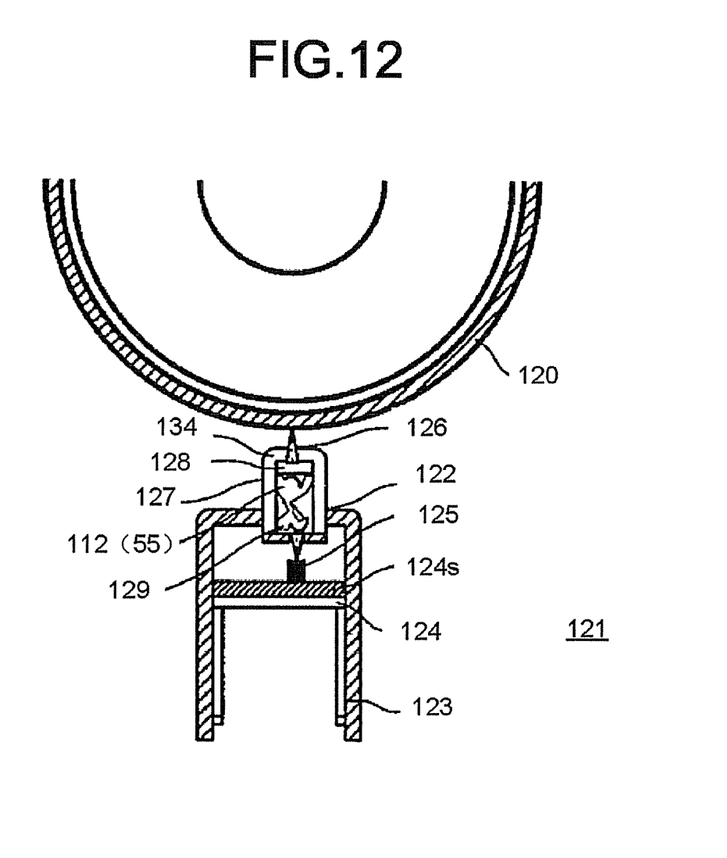
FIG. 12 is a diagram illustrating the unit structure of other example of integrating the optical device according to the embodiment.

FIG. 12 is a cross-sectional view illustrating an example of the other structure in a case where the optical device of an example of the present invention is constituted as a LED print head.

Light from a LED print head 121 is emitted to the surface of a photoconductive drum 120. A LED base 124s is arranged on a support member 124 inside a housing 123 having a through hole 122 thereon. A LED array chip 125 connected with wirings on the LED base 124s is arranged.

A lens array holder 127 having a through hole 126 thereon in figure is incorporated into the through hole 122. The abovementioned lens mirror array through which the light from the lower part passes is incorporated into the lens array holder 127 and a dustproof glass 128 is inserted between the through hole 126 and the lens mirror array. An incident side aperture 129 is formed at the incident side of the optical element 55.

The surface of the rotating photoconductive drum 120 is irradiated with the light passing through the optical element 55.

A plurality of LED elements is arranged parallelly in a horizontal scanning direction and each LED element emits and extinguishes light based on a printing signal obtained from the circuit of the LED base 124s. The LED array chip 125 in which a plurality of LED elements is arranged parallelly is installed on the LED base 124s in accordance with a printing width. Light entering into the incident side aperture 129 at a predetermined angle in a vertical scanning direction is shielded with respect to the light emitted from the light-emitting LED elements. After the unshielded light holds a predetermined property through the optical element 55, the light serving as stray light is shielded by the lens array holder 127. The unshielded light is imaged as the erecting equal-magnification image of LED light-emitting section on the photoconductive drum 120.

For example, the LED elements with 42 μm pitch are arranged in the LED print head of 600 dpi in a horizontal scanning direction. These LED elements emit and extinguish light according to the printing signal to form a latent image on the photoconductive drum 120.

After the dustproof glass 128, an array body 112 of the optical element 55 and the incident side aperture 129 are inserted into the lens array holder 127, the array body 112 of the optical element 55 is applied with a predetermined pressure in the upper right of figure through a tool (not shown) and fixed in the lens array holder 127 through, for example, adhesive. Afterwards, the lens array holder 127 is adjusted to a position corresponding to the housing 123 and then adhered.

The LED base 124s on which the LED array chip 125 is installed is fixed on the support member 124. Further, the support member 124 is adjusted in such a manner that the image comes to a predetermined position, and then fixed on the housing 123.

In accordance with the embodiment, the light-shielding surface 74 keeps a predetermined distance with the first lens surface nearby the principal ray and is formed into a shape protruding towards the first lens surface, and thus compared with the conventional lens mirror array, the abovementioned lens mirror array enables the stray light not to escape to reduce aspect ratio of convex light-shielding section. The predetermined distance is a distance from a part where the surface 74 protrudes towards the first lens surface 61 side of the side walls to a position where the light ray in a case in which the object point position in a horizontal scanning direction is on a surface containing the optical axis of the first lens surface is not shielded by the light-shielding surfaces 72a and 72b.

In this way, through reducing the aspect ratio of the convex light-shielding section, the flow of the resin during molding may be excellent when the lens mirror array is manufactured by integral molding, and thus it is possible to shorten the molding time. Otherwise, it is possible that the width of the protrusion to the pitch is increased so as to improve optical efficiency.

In a case of the light-shielding surface 74' with the conventional method, distance between the surface (surface orthogonal to principal ray axis) between side wall part and end part of optical elements adjacent to two sides of the first mirror surface and the first lens surface is reduced at edge. However, at all the positions according to the present embodiment, it is possible to avoid the decrease of the distance between the light-shielding surface 74 and the first lens surface, and thus, the risk of colliding the shape of the first lens surface can be reduced. In accordance with the embodiment, by molding the lens and the mirror integrally, the deviation of the optical axis between the lens and the mirror is reduced and thus, a lens mirror array, an optical unit and an image forming apparatus with excellent formability, high optical efficiency and less stray light can be obtained.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
a light source array comprising a light source to emit light;
a lens mirror array comprising a plurality of optical elements, each optical element comprising
a first lens surface at a top of a convex portion protruding outwards and configured to converge the light emitted from the light source array,
a protrusion comprising a first mirror surface configured to reflect the light emitted from the first lens surface at the top and a light-shielding surface having side walls at two sides thereof with respect to a light advancing direction and configured to prevent advance of the light through the side walls,
a second mirror surface configured to reflect the light reflected by the first mirror surface of the protrusion, and
a second lens surface configured to image the light emitted from the second mirror surface on an image plane,
the plurality of optical elements are arranged in a horizontal scanning direction; and
when viewing the first lens surface side between the side-wall surfaces of arranged adjacent optical elements in a horizontal scanning direction, the protrusion keeps a predetermined distance with the first lens surface and a principal ray and is formed into a shape protruding towards the first lens surface side;
a photoconductor comprising a photoconductive surface, the light through the lens mirror array being irradiated on the photoconductive surface to form an latent image; and
a developing section configured to visualize the latent image formed on the photoconductive surface.

2. The image forming apparatus according to claim 1, wherein,
a light-shielding film is formed on the side walls at two sides of the protrusion and on the surface of the surface of the first lens surface side between the side-wall surfaces of the adjacent optical elements.

3. The image forming apparatus according to claim 2, wherein
the light-shielding film is coated with UV ink.

4. A scanner, comprising:
a document table, a document is placed on the document table;
a housing comprising,
a light source comprising a light source to emit light in a horizontal scanning direction,
a lens mirror array comprising a plurality of optical elements, each optical element comprising
a first lens surface at a top of a convex portion protruding outwards and configured to converge the light emitted from the light source array,
a protrusion comprising a first mirror surface configured to reflect the light emitted from the first lens surface at the top and a light-shielding surface having side walls at two sides thereof with respect to a light advancing direction and configured to prevent advance of the light through the side walls,
a second mirror surface configured to reflect the light reflected by the first mirror surface of the protrusion and
a second lens surface configured to image the light emitted from the second mirror surface on an image plane,
the plurality of optical elements are arranged in the horizontal scanning direction; and
when viewing the first lens surface side between the side-wall surfaces of arranged adjacent optical elements in a horizontal scanning direction, the protrusion keeps a predetermined distance with the first lens surface and a principal ray of the light emitted from the first lens surface is formed into a shape protruding towards the first lens surface side.

5. The scanner according to claim 4, further comprising a sensor, the light through the lens mirror array is imaged on the sensor in the housing.

6. The scanner according to claim 5, wherein
the light source is a LED line lighting device.

7. The scanner according to claim 6, further comprising a light shield having a slit, the light shield is installed an upper portion of the housing.

* * * * *